May 24, 1960
S. A. SNYDER
2,937,525
SURFACE THERMOMETER
Filed Feb. 15, 1956
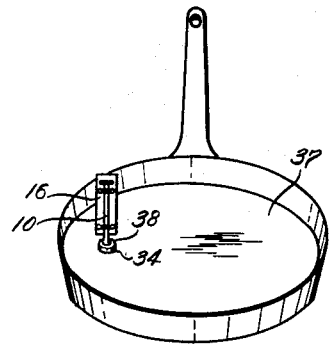
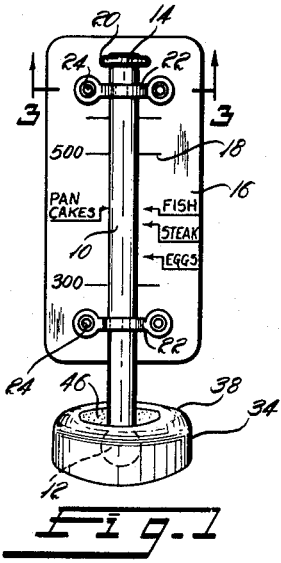
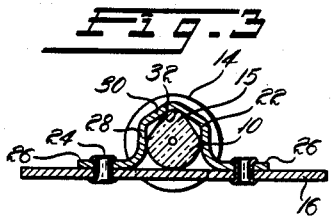
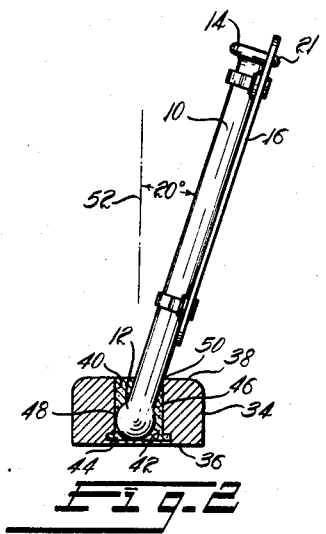
INVENTOR
SAMUEL A. SNYDER
BY
ATTORNEYS

United States Patent Office 2,937,525
Patented May 24, 1960

2,937,525
SURFACE THERMOMETER

Samuel A. Snyder, Springfield, Ohio, assignor to Thermometer Corporation of America, Springfield, Ohio, a corporation of Ohio Filed Feb. 15, 1956, Ser. No. 565,627

9 Claims. (Cl. 73—377)

This invention relates to thermometers and more particularly to a thermometer of the expansible fluid type adapted for measuring the surface temperature of griddles, flat-irons, hot plates or other surfaces for cooking or where high temperatures are present.

Successful results in preparing many food dishes depend in a large part on proper cooking temperatures. This is true of food prepared on the top of a stove as well as in an oven. Only by experience can one learn to properly control heat of a cooking surface, as for example in a skillet or griddle to obtain the desired results. It is well recognized that the fry-pan is in partial disrepute primarily because people too often fry at higher temperatures than should be used. Eggs, for example, should never be fried fast at high temperature as it makes the albumen rubbery and indigestible.

It is a major object of the present invention to provide a novel thermometer adapted to be placed on the heated surface of a griddle or other cooking utensil to provide in a convenient manner an indication of the temperature of a cooking surface thereby enabling a person wholly inexperienced in cooking to maintain proper cooking temperatures for pan-frying or sauteing.

Another object of the invention is to provide a novel thermometer which causes little interference with cooking operations when positioned in the cooking utensil, has good support stability, takes up only a small amount of space on the cooking surface and when positioned in the cooking utensil on an ordinary stove is easily readable by the cook.

A still further object of the invention is to provide a novel support for a conventional thermometer tube which adapts the thermometer for convenient use even when in contact with food on the cooking surface of a utensil on an ordinary home cooking stove.

A further and more detailed object is the provision of a novel base as a support member which firmly supports the thermometer tube in a tilted position without requiring special supports or other equipment during manufacture or while in use.

These and other objects of the invention will become more fully apparent from the claims, and from the description as it proceeds in connection with the drawings wherein:

Figure 1 is a front view in elevation of the thermometer assembly according to the invention;

Figure 2 is a side view of the thermometer assembly of Figure 1 with the base member shown in section;

Figure 3 is a sectional view of the thermometer assembly taken along lines 3—3 of Figure 1 showing the details of the bracket mounting means for supporting the scale plate on the thermometer tube; and Figure 4 is a view showing the thermometer of the present invention positioned in a skillet as an example of its intended use.

Referring now to the drawing wherein like reference numerals have been used on the same parts in each of the figures, a thermometer tube 10 is provided having an enlarged bulb end 12 which in the illustrated embodiment is spherical and contains a reservoir of a conventional thermo-expansible fluid. On the upper end of thermometer tube 10 is a buttonhead 14, the position of which is determined from the height of the fluid column in tube 10 at a predetermined calibration temperature. Buttonhead 14 is preferably formed by being upset against a plane surface when heated as part of the tube closing operation to form the thermometer tube as fully described and claimed in copending application Serial No. 475,187 by Sidney Weksler filed December 15, 1954 and assigned to the assignee of the present invention. Thermometer tube 10 may be circular or non-circular as desired, the illustrated embodiment having a conventional ridge section 15 on the front surface of tube 10 which serves to magnify the width of the fluid column.

Scale plate 16 may be formed from a thin sheet, preferably planar, of material such as aluminum to be of light weight so that the thermometer when assembled has good stability and does not tend to upset easily. Scale plate 16 is provided with calibrations including numbers and suitable legends which are readable from a distance of several feet so that the temperature indicated by the thermometer when in a skillet on an ordinary stove is readily visible to the cook. Slot 20 in the upper part of scale plate 16 is provided to receive edge 21 of buttonhead 14 to prevent axial movement of the scale plate along tube 10.

Scale plate 16 is secured near its upper and lower ends to thermometer tube 10 by a pair of identical bracket straps 22. The ends 26 of straps 22 are secured to the scale plate as by rivets or eyelets 24. Opposite ends of eyelets 24 are bent over to engage the upper surface of end 26 of straps 22 and the back surface of scale plate 16. Strap 22 is formed with a pair of sections 28 contacting opposite sides of thermometer tube 10 and extending substantially normal to the surface of scale plate 16. Sections 30 over the front of thermometer tube 10 are angularly disposed with each other and with sections 28 to provide a vertex 32 which contacts the front surface of section 15 of thermometer tube 10 and prevents rotation of thermometer tube 10.

Base member 34 is of a material having good heat conducting properties and at the same time is inert to foods to prevent adding any objectionable taste, color or odor. Aluminum is accordingly preferred, and additionally, is easy to form into the desired shape. Bottom surface 36 of base member 34 is given a smooth finish and its normal position in use is direct contact with the bottom or cooking surface of the griddle 37 or other heated utensil as shown in Figure 4. It is important that the thickness or height of base 34 is sufficient to prevent foods such as pancakes, scrambled eggs or the like from covering surface 38. Even though such foods do not stick to any significant extent to base 34, if food completely surrounds the base, the food must be separated from around the base to permit turning. If the food covers surface 38, the cutting and removing of certain foods, such as pancakes, omelets, or the like, from around base 34 just before turning is made more complicated. A thickness or height between surfaces 36 and 38 of approximately one-half inch accordingly has been found to be quite satisfactory since the depth of foods to be turned does not ordinarily exceed that amount.

Surface 36 on the bottom of body 34 must be adequately large to provide a stable support so that the thermometer assembly does not upset when food around base 34 is being mixed or turned and should also be made small so as to provide minimum interference with cooking operations. Making base member 34 out of one inch diameter stock provides adequate stability for the embodiment illustrated where the thermometer tube is approximately 3 to 3½ inches long.

A central opening 40 is provided in upper surface 38 of base member 34 having a diameter adequately large for freely receiving bulb end 12 of thermometer tube 10. Opening 40 preferably extends almost completely through base 36 with only approximately one-sixteenth inch thickness remaining between surface 42 and bottom surface 36 so that bulb 12 is as close to the surface whose temperature is to be measured as possible.

Inside of opening 40 an undercut 44, which may be an annular groove extending into the walls of opening 40 is provided. The exact position of the undercut is not critical and in the illustrated embodiment groove 44 is located adjacent surface 42 which is formed to be planar to permit bulb end 12 of the thermometer tube to be uniformly close to surface 36 regardless of the position of the thermometer tube in base 34.

For securing thermometer tube 10 in base 34, a body 46 or chunk of settable thermoplastic material having good heat conducting properties such as solder is placed in the base at room temperature. Base 34 is then placed on a heating platen, the temperature of which is controlled to a range between 590° F. and 600° F. The thermoplastic material 46 may, for example, be a lead base alloy type of solder having a melting range between 560° F. to 600° F. When the solder is molten, thermometer tube 10 with scale plate 16 attached is inserted in opening 40 with bulb 12 in contact with surface 42 at the bottom of opening 40 thus placing bulb 12 within one-sixteenth of an inch of the heated surface whose temperature reading is desired.

The assembled thermometer is then allowed to cool thus causing solder 46 to solidify. The melting point of solder 46 must be above the ordinary using range of the thermometer which for cooking does not ordinarily exceed 500° F. Thermometer tube 10 similarly must be capable of withstanding the temperature of the molten solder without breakage for initial assembly. The molten solder fills groove 44 and is by this means secured to base 34 independently of the degree of surface bonding between the solder and the walls of opening 40. Some surface bonding however is desirably provided in the present embodiment to prevent rotation or twisting of the thermometer tube and solder with respect to base 34. The enlarged size of bulb 12 adequately secures thermometer tube 10 in solder 46. The amount of solder used should preferably fill opening 40 after the thermometer tube is placed in final position to prevent accumulation of food in opening 40 and to simplify washing of the thermometer assembly.

During the cooling period of the solder, thermometer tube 10 is preferably tilted at an angle in the vicinity of 20°. This is an important feature of this surface thermometer because the surface of stoves, grills, and other cooking apparatus are always far below eye level and generally about waist high. It is important to be able to easily read the thermometer during cooking operation at a standing position because of the many other duties which are ordinarily concomitantly performed by a person while cooking. Thus tilting of the thermometer tube greatly facilitates readability of the thermometer from a normal standing position.

The exact amount of tilt is controlled in accordance with a further feature of the invention by appropriate selection of the diameter of opening 40 in base 34 and then placing the thermometer tube 10 in base 34 in a position so that the front of bulb 12 contacts the edge wall of opening 40 at 48 and the back cylindrical surface of tube 10 lies against the edge of opening 40 on surface 38 at 50. This particular relationship of parts provides the desired angle of tilt of tube 10 with respect to line 52 normal to surface 36 without requiring a special jig or taking any step which adds to the cost of manufacture. The only special act required is that scale plate 16 be properly orientated to lie in a plane perpendicular to a plane defined by the axis of thermometer tube 10 and line 52 when the thermometer tube is placed in the molten solder.

In use, pancakes, eggs and other similar foods do not adhere or stick to base 34 even though base 34 comes into contact with the food. There is thus provided a compact thermometer assembly that can be conveniently used on the heated surface of a cooking utensil, hot plate, grill or the like to readily indicate the cooking surface temperature. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A thermometer assembly for measuring temperature of a heated surface comprising a thermometer tube having a bulb end and calibration means spaced from said bulb end; a base member of a material having good heat conducting properties and inert to food, and being of such weight and shape as to provide a stable support for the thermometer assembly; a flat surface on said base for supporting said thermometer assembly in good heat transmitting relationship on said heated surface; the side of said base member opposite said flat surface having a single opening for receiving the bulb end of said thermometer; said opening being of such depth that the bottom of the thermometer tube is supported at a position close to said flat surface; and a body of settable thermoplastic material having good heat transfer properties filling said opening around the thermometer tube and securing the thermometer tube to said base.

2. The thermometer assembly as defined in claim 1 wherein said thermoplastic material is a solder having a melting temperature above a temperature of 550° F. and lower than the breaking temperature of the thermometer tube.

3. The thermometer assembly as defined in claim 1 wherein the opening in said base member includes an undercut filled with the thermoplastic material.

4. The thermometer assembly as defined in claim 1 wherein the side of the base member containing said opening is at least a half-inch from said flat surface to prevent, when used in a cooking utensil, food which is to be turned during cooking from covering said side.

5. The thermometer assembly as defined in claim 1 wherein the thermometer tube is mounted in said opening with the axis of the thermometer tube tilted with respect to the axis of said opening for enhancing readability of the temperature indication of the thermometer assembly when mounted on the cooking surface of an ordinary stove.

6. The thermometer assembly as defined in claim 5 wherein the axis of said opening is perpendicular to said flat surface and the calibration means includes a calibrated lightweight planar scale plate secured to the thermometer tube so as to prevent axial and twisting movement of the scale plate relative to the thermometer tube, the plane of said scale plate being normal to a plane defined by the axis of a thermometer tube and the axis of said opening.

7. In a thermometer assembly, a thermometer tube having a bulb on one end and calibration means along a portion of the thermometer tube spaced from the bulb end, a metal base member of heat conducting material having a planar surface on one side, the opposite side of said base member having an opening for receiving the bulb end of said thermometer tube, the axis of said opening being perpendicular to said planar surface, and means comprising a body of settable thermoplastic material having good heat transfer properties melted and solidified around the bulb end and the thermometer tube in the opening of said base member for securing the thermometer tube in said opening with the axis of said tube angularly tilted with respect to a line normal to the planar surface of said base member and intersecting said thermometer tube axis.

8. In a thermometer assembly, a thermometer tube having a bulb end with an enlarged outer periphery, calibration means along a stem portion of the thermometer tube spaced from said bulb end, a rigid base member having good heat-conducting properties and a planar surface on a bottom side, the top side of said base member having an opening for receiving said bulb end terminating with a bottom surface supporting the bulb end of the thermometer tube, and means comprising a body of settable thermoplastic material having good heat transfer properties melted and solidified around the bulb end and the thermometer tube in the opening of said base member for securing the thermometer tube to said base member with the bulb end against a wall at one side of said opening and the thermometer tube stem abutting the wall at a diametrically opposite side of the opening adjacent the top side of said base member.

9. A thermometer assembly comprising a thermometer tube having a bulb end with an enlarged outer periphery; calibration means along a stem portion of said thermometer tube spaced from said bulb end; a base member of good heat conducting material having a surface on one side adapted to abut against a surface of a body, the temperature of which is to be measured; said base member having an opening in a second side for receiving the bulb end of said thermometer tube and an undercut in a side wall of said opening; and a settable thermoplastic material in said opening having a melting temperature above the temperature indicating range of said thermometer tube and lower than the breaking temperature of said tube.

References Cited in the file of this patent
UNITED STATES PATENTS

| | | |
|---|---|---|
| 2,004,627 | Hoeflich | June 11, 1935 |
| 2,293,276 | Brown et al. | Aug. 18, 1942 |
| 2,336,238 | Fordyce et al. | Dec. 7, 1943 |
| 2,573,205 | Lamb | Oct. 30, 1951 |
| 2,688,876 | Barnes | Sept. 14, 1954 |
| 2,737,050 | Moniger | Mar. 6, 1956 |